(12) United States Patent  
Stein (10) Patent No.: US 11,523,971 B2  
(45) Date of Patent: Dec. 13, 2022

(54) SYSTEM AND METHOD FOR PRODUCING A BAG FOR MEDICAL PURPOSES (71) Applicant: KIEFEL GMBH, Freilassing (DE)

(72) Inventor: -Ing Bernd Stein, Kirchanschöring (DE)

(73) Assignee: Kiefel GmbH, Freilassing (DE)

(*) Notice: Subject to any disclaimer, the term of this patent is extended or adjusted under 35 U.S.C. 154(b) by 734 days.

(21) Appl. No.: 15/551,854

(22) PCT Filed: Feb. 17, 2016

(86) PCT No.: PCT/DE2016/000058  
§ 371 (c)(1),  
(2) Date: Jan. 26, 2018

(87) PCT Pub. No.: WO2016/131438  
PCT Pub. Date: Aug. 25, 2016

(65) Prior Publication Data  
US 2018/0147116 A1    May 31, 2018

(30) Foreign Application Priority Data  
Feb. 20, 2015 (DE) .................. 10 2015 002 005.6

(51) Int. Cl.  
*A61J 1/14* (2006.01)  
*A61J 1/10* (2006.01)  
(Continued)

(52) U.S. Cl.  
CPC .............. *A61J 1/1468* (2015.05); *A61J 1/10* (2013.01); *B26D 1/04* (2013.01); *B26D 3/16* (2013.01);  
(Continued)

(58) Field of Classification Search  
CPC ... A61J 1/1468; A61J 1/10; A61J 1/16; B26D 1/04; B26D 3/16; B26D 7/14;  
(Continued)

(56) References Cited

U.S. PATENT DOCUMENTS 3,244,576 A * 4/1966 Swartz ................ B29C 66/8242  
156/513  
4,186,292 A * 1/1980 Acker ....................... A61J 1/05  
219/769  
(Continued)

OTHER PUBLICATIONS

International Preliminary Report on Patentability dated Aug. 22, 2017 in related PCT application PCT/DE2016/000058, 7 pages.  
(Continued)

*Primary Examiner* — Sameh Tawfik  
(74) *Attorney, Agent, or Firm* — Stinson LLP (57) ABSTRACT

In order significantly to reduce the risk of contamination of a bag for medical purposes, in particular due to residual particles of tube material caused during cutting of a tube for access to the bag, the invention proposes a system (1) for producing a bag for medical purposes, comprising a tube transfer station (2) with a transfer means (3) for transferring a tube (11) coming into the tube transfer station (2) to a holder (10) and for the severing there of a tube section (17) transferred to the holder (10) from a remaining portion (18) of the incoming tube (11) in order subsequently to be able to make the severed tube section (17) connectable to two film layers for forming an access to the bag, wherein the tube transfer station (2) has a tube-tension-holding means (15) on the holder side and also a tube-pulling means (16), which means are designed to introduce tensile forces (19) between the severed tube section (17) and the remaining portion (18) of the incoming tube (11) while the severing takes place.

25 Claims, 4 Drawing Sheets

(51) Int. Cl.
    *B26D 3/16*     (2006.01)
    *B26D 7/14*     (2006.01)
    *B26D 1/04*     (2006.01)
    *B29C 65/00*     (2006.01)
    *B29L 31/00*     (2006.01)
    *B29C 65/02*     (2006.01)
    *A61J 1/16*     (2006.01)

(52) U.S. Cl.
    CPC .... *B26D 7/14* (2013.01); *A61J 1/16* (2013.01); *B29C 65/02* (2013.01); *B29C 66/53262* (2013.01); *B29C 2793/0081* (2013.01); *B29L 2031/7148* (2013.01)

(58) Field of Classification Search
    CPC .............. B29C 65/02; B29C 66/53262; B29C 2793/0081; B29L 2031/7148
    USPC ........................................................ 493/199
    See application file for complete search history.

(56) References Cited

U.S. PATENT DOCUMENTS

| | | | | |
|---|---|---|---|---|
| 4,950,347 | A * | 8/1990 | Futagawa | B29C 65/04 156/272.4 |
| 4,954,678 | A * | 9/1990 | Harmony | B29C 57/00 156/273.7 |
| 5,507,904 | A * | 4/1996 | Fisher | A61J 1/10 156/252 |
| 5,678,732 | A * | 10/1997 | Gianpaolo | A61J 1/10 222/107 |
| 6,635,324 | B1 * | 10/2003 | Wolf, Jr. | A61M 39/08 428/35.3 |
| 6,701,055 | B2 * | 3/2004 | Yasuda | B26D 1/04 385/134 |
| 7,695,420 | B2 * | 4/2010 | Gelli | B26D 1/58 493/276 |
| 10,239,221 | B2 * | 3/2019 | Persson | B26D 3/16 |
| 2004/0123883 | A1 * | 7/2004 | Pritchard | B29C 65/18 134/63 |
| 2014/0138024 | A1 * | 5/2014 | Hinterseer | B29C 65/04 156/274.4 |

OTHER PUBLICATIONS

International Search Report and Written Opinion dated Jun. 27, 2016 in related PCT application PCT/DE2016/000058, 15 pages.

* cited by examiner

SYSTEM AND METHOD FOR PRODUCING A BAG FOR MEDICAL PURPOSES

CROSS REFERENCE TO RELATED APPLICATIONS

This application is a U.S. national stage application of PCT application PCT/DE2016/000058, filed Feb. 17, 2016 and claims priority to German application 10 2015 002 005.6 filed Feb. 20, 2015, each of which is hereby incorporated by reference in its entirety.

FIELD OF THE DISCLOSURE

The invention relates to systems for the manufacture of bags for medical purposes and methods for manufacturing bags for medical purposes.

BACKGROUND OF THE DISCLOSURE

Generic systems and methods for severing a single tube piece, which later is part of an access of a medical bag, severed from a tube, are well known in the art. In particular, it is known to guide a tube to a tube mounting or tube transfer station and to separate it there into individual tube pieces.

SUMMARY

In one aspect, a system for the manufacture of a bag for medical purposes includes a tube transfer station having a transfer means for transferring a tube coming into the tube transfer station to a holder and for the local severance of a transferred tube piece from a remaining tube of the incoming tube to the holder in order subsequently be able to make the severed tube piece connectable to two film layers for forming an access to the bag. The tube transfer station has a tube holding means on the holder side and, on the other side, a tube pulling means, which are arranged to introduce tensile forces between the severed tube piece and the remaining tube of the incoming tube, while the severance is performed.

In another aspect, a method is for the manufacture of a bag for medical purposes. A tube coming into a tube transfer station is transferred by means of a transfer means to a holder for local severance of tube piece from a remaining tube of the incoming tube to the holder so that the tube piece is subsequently connected to two film layers for forming an access to the bag. The method includes feeding the incoming tube to the holder and tightly holding the incoming tube on the tube piece to be severed on the side of the holder by means of a tube holding means. The method includes longitudinally pulling the incoming tube between the tube holding means and a feed so that tensile forces act on a designated point for severing. The method includes separating the tube piece from the remaining tube of the incoming tube.

DETAILED DESCRIPTION

The invention relates, on the one hand, to a system for the manufacture of a bag for medical purposes, comprising a tube transfer station having a transfer means for transferring a tube coming into the tube transfer station to a holder and locally severing a tube piece transferred to the holder from a remaining tube of the incoming tube in order subsequently to be able to make the severed tube piece connectable with two film layers for forming an access to the bag.

On the other hand, the invention relates to a method for manufacturing a bag for medical purposes, in which a tube coming into a tube transfer station is transferred by means of a transfer means to a holder for severing a tube piece transferred to the holder from a remaining tube of the incoming tube, so that the tube piece is subsequently connected to two film layers for forming an access to the bag.

In this case, individual tube pieces are severed from an "endless tube" in order subsequently to be able to provide them separately to the films. For this purpose, one end of this endless tube is fed to a holder and fixed there, so that a tube piece, which is then severed from a remaining tube of the endless tube, is held by the holder. After its severance, the tube pieces severed in this way are placed between two films by means of a correspondingly configured apparatus and then welded to the two films into a medical bag.

It is understood that one must avoid contamination by dirt, material, process-related particles or the like in the production of such medical bags in order to reduce or exclude the risk of contamination of the medical product later stored in the medical bag.

The object of the invention is to further develop, in particular, generic systems for manufacturing a bag for medical purposes, in such a way that the risk of contamination is reduced, in particular, by a tube-formulated access of the bag.

The object of the invention is solved by a system for manufacturing a bag for medical purposes comprising a tube transfer station with a transfer means for transferring a tube coming into the tube transfer station to a holder and for locally severing a tube piece transferred to the holder from a remaining tube of the incoming tube, in order to make the severed tube piece subsequently connectable to two film layers for forming an access to the bag, wherein the tube transfer station has, on the other side, a tube holding means and on the other side a tube pulling means which are arranged to provide tensile forces between the severed tube piece and the remaining tube of the incoming tube while the severing is performed.

In the present case, the tube transfer station is designed in particular in such a way that a tube piece to be severed and transferred to the holder is fixed stationary at least temporarily to the holder by means of a tube holding means before the severance.

Furthermore, tensile forces can be introduced into the tube clamped or fixed in this way by means of the tube transfer station, so that the incoming tube can be provided, at least in a tube region, between the transfer means and the holder in a pre-stressed manner at the tube transfer station, whereby in turn the tube piece transferred to the holder can be severed from the remaining tube of the incoming tube located on the side of the transfer means in such a way that the actual severance process results in significantly fewer tube material residual particles coming into the environment.

In other words, this means that fewer tube material residual particles caused by the severing process are generated through the severing process, so that overall the risk is hereby reduced that such tube material residual particles will contaminate the severed tube piece on the one hand, but also the remaining tube of the incoming tube on the other hand, whereby the risk is reduced that such tube material residual particles ultimately reach the medical product which is to be stored in the medical bag.

In short: In the present case, it is possible to perform an extremely clean cut at the incoming of the tube.

To this extent, the object of the invention is also solved by a method for manufacturing a bag for medical purposes, in which a tube coming into a tube transfer station is transferred by means of a transfer means to a holder for locally severing a tube piece transferred to the holder from the remaining tube of the incoming tube, so that the tube piece is then connected to two film layers for forming an access to the bag, wherein the method is characterized in that the following steps are performed, namely: first, feeding the incoming tube to the holder; secondly, tightly holding the incoming tube on the tube piece to be severed on the side of the holder by means of a tube holding means; third, longitudinally pulling the incoming tube between the tube holding means and a feed so that tensile forces act on the designated point for severing; and fourthly, severing the tube piece from the remaining tube of the incoming tube.

By means of this proposed method, it is possible to perform an extremely clean cut on the incoming tube, whereby significantly fewer tube material residual particles are generated during the severing process and enter the environment.

With regard to the present construction, the holder can be designed almost arbitrarily as a function of the tube transfer station, in particular the transfer means.

The end of the incoming tube facing the holder or the tube piece to be severed can be easily transferred to the holder in a structurally simple manner when the holder has a mandrel on which the incoming tube can at least be partly mounted.

In this respect, it is also possible to speak of a tube mounting station with regard to the tube transfer station, wherein it is expressly emphasized at this point that no "mounting" is required in order to realize the invention, but the mere transfer of the tube end to a holder can suffice.

In this context, a preferred embodiment variant provides that the holder has a mandrel-shaped central electrode, by means of which the tube piece can be welded at the same time to film layers of the bag at a further processing station of the present system.

To this extent, it is also expedient in process technology when the incoming tube is fed to a mandrel, in particular to a central electrode.

If desired, the incoming tube can be heated directly at the tube transfer station by means of a mandrel-shaped central electrode, since it has been shown that the tube piece transferred to the holder can be severed much better from the remaining tube of the incoming tube due to better sliding properties in the heated state.

More specifically, by heating the incoming tube in a region of the severance site, the formation of tube material residual particles caused by a severance can be further reduced.

It has been shown that the tube piece to be transferred can simply be mounted on this mandrel when the outer diameter of the mandrel has to be compatible with the inner diameter of the incoming tube such that the severed tube piece can preferably be held on the mandrel solely by virtue of a frictional connection, so that the severed tube piece can be transported reliably from the tube transfer station to a further processing station of the system for manufacturing a bag.

However, in order that higher tensile forces can also be introduced into the incoming tube without the risk of releasing the tube piece to be severed from the holder or from the mandrel or from the mandrel-shaped central electrode, it is advantageous when the holder has an externally engaging tube clamp.

If the holder is fixed in the introduction direction of the incoming tube, the incoming tube can be mounted securely by means of the transfer means into a correspondingly stationary fixed mandrel or onto a corresponding stationary fixed mandrel-shaped central electrode and tensile forces can be introduced into the incoming tube without the holder moving adversely in the introduction direction or in the main working direction of the tensile forces.

Thus, the holder remains positioned stationary with the tube piece to be severed fixed thereon, when pulling on the incoming tube for application or introduction of the tensile forces against the introduction direction.

To this extent, a correspondingly advantageously configured method variant also provides that the incoming tube is fixed to a tube piece to be severed with the holder against retraction, is clamped firmly, particularly from the outside.

Alternatively or cumulatively, clamping could also take place through a radially expandable mandrel or by a radially expandable mandrel-shaped central electrode.

In the present case, radial means generally transverse to the introduction direction of the incoming tube.

It is understood that the present transfer means can also be configured almost arbitrarily.

A further preferred variant of the method provides that the feeding of the tube takes place through a feed through channel, whereby the end of the incoming tube facing the holder can be positioned more precisely in front of the mandrel or in front of the mandrel-shaped central electrode.

In order to be able to guide the incoming tube more precisely when transferring it to the holder or when mounting it onto the mandrel or the mandrel-shaped central electrode in the radial direction relative to the introduction direction, i.e., laterally, it is correspondingly advantageous when the transfer means has a feed through channel for the incoming tube.

The incoming tube can be transferred particularly precisely to the holder when the transfer means can be moved back and forth in the introduction direction.

In other words, this means that the transfer means, in particular, is mounted translatively in a tube feed direction and in a tube return direction in the tube transfer station with respect to the holder.

A particularly preferred embodiment here provides that the transfer means is arranged to move the feed through channel close to the holder, then to transfer the incoming tube at least with the tube piece to be severed, and after severing the tube piece, to again remove the remaining tube of the incoming tube from the holder through the feed through channel.

The tube pulling means proposed in the context of the invention can also be of virtually any design.

The tube pulling means expediently has a retraction drive so that the incoming tube clamped on the holder by the externally engaging tube clamp can be pulled counter to the introduction direction or the tube feed direction and thus in the tube return direction.

To always introduce sufficiently high tensile forces, it is advantageous when the tube pulling means has a clamp, which is driven opposite the tube pulling means, preferably by means of a coupling with the transfer means.

Specifically, when the clamp is fastened to the transfer means, the clamp can be moved translatively with respect to the holder by means of the transfer means.

In addition, it is advantageous when the tube pulling means is arranged, in cooperation with the tube holding means, to exert an elongation of 1% to 10% on the transition from tube piece to remaining tube between the tube pulling means and the tube holding means, in particular from 2% to 6%, in particular about 4%.

Particularly in the case of such a selected elongation in the designated severing region of the incoming tube, the formation of tube material residual particles during the severance of the tube piece to be severed from the remaining tube of the incoming tube can be particularly effectively avoided.

In this respect, a corresponding procedure is also advantageous in which the longitudinal drawing of the tube is performed with a longitudinal elongation between 1% and 10%, preferably 2% to 6%, particularly preferably approximately 4%.

Various means can be used for severing the tube piece from the incoming tube, for example, a wire loop or the like.

A particularly clean severance of the tube piece from the incoming tube within the context of the invention can be ensured without the remaining features of the invention when the tube transfer station has a blade which is driven from a standby position through the incoming tube.

By means of a blade driven in this way, the tube can be simply cut through in construction.

Thus the object of the invention is also solved by a system for manufacturing a bag for medical purposes comprising a tube transfer station having a transfer means for transferring a tube coming into the tube transfer station to a holder and for locally severing a tube piece transferred to the holder from a remaining tube of the incoming tube, in order subsequently to make the tube piece connectable to two film layers for forming an access to the bag, wherein the tube transfer station has a blade which is driven from a standby position through the incoming tube, wherein the blade is driven released, after severance, from the residual tube, longitudinally in the tube direction or with a movement component along the tube direction.

The fact that the blade can be released after disconnecting from the incoming tube can reduce the risk that tube material residual particles are produced only by an additional contact of the blade with the tube.

Advantageously, the blade is thereby at least free from the severed tube piece, but preferably both from this tube piece and from the remaining tube of the incoming tube.

The blade can again be removed very quickly from a feeding area of the incoming tube when the blade has a tilting drive. Thus, the running tube can be fed to the holder as quickly as possible.

For this reason too, it is advantageous when the blade is tilted for release.

Specifically, reintroduction of the incoming tube into the severance region for a next severing operation can be effected more quickly when the tilting drive is arranged tipping away the blade from the transfer means.

If the blade is driven to move obliquely through the tube, the severance of the incoming tube can be further improved by virtue of an advantageous cutting guide.

The incoming tube can be cut through even more favorably when the blade has a thickness of a maximum of 1 mm, in particular of a maximum of 0.8 mm, preferably of a maximum of 0.5 mm, particularly preferably of less than 0.2 mm.

It has been found that the thinner the blade is configured in terms of its thickness, the risk of contamination of the incoming tube by tube material residual particles can be further reduced.

In this case, very good improved cutting results can be achieved when the blade has a thickness of a maximum of 1 mm, especially the blade designed with this thickness is very long-lived.

In particular, the tube transfer station can be constructed even more simply when the tube pulling means and the blade are arranged at the transfer side, while the tube holding means is arranged on the holder side.

With regard to the method, it is advantageous when the holder and the transfer means are removed from one another, in particular when the transfer means is retracted, and the incoming tube is pulled into the designated point for severance into the length.

It is also advantageous for the severance process to be performed by means of a blade which is fed through the incoming tube while the tensile force acts on the designated point for severing, so that the incoming tube follows at least the severed point of the tensile force on the one hand, preferably on both sides and a cleft is obtained after its severance, which is wider than a thickness of the blade.

The formation of undesirable tube material residual particles can be significantly reduced when the blade is heated to a temperature between 40° C. and 70° C. for a severance, primarily between 40° C. and 60° C., in particular around 50° C.

By means of the system described herein or the method described here, it is also possible in particular to dispense with additional aids for severing the incoming tube so that it is expedient for severance to be effected by means of alcoholic lubricant.

Thus, additional contamination of the access of the medical bag can be reduced.

It is understood that the features of the solutions described above or in the claims can also be combined if necessary in order to be able to implement the presently achievable advantages and effects correspondingly cumulatively.

In addition, further features, effects and advantages of the present invention are explained with reference to the accompanying drawing and the following description in which, by way of example, a tube transfer station is shown and described in a system for manufacturing a medical bag.

Figure 1:
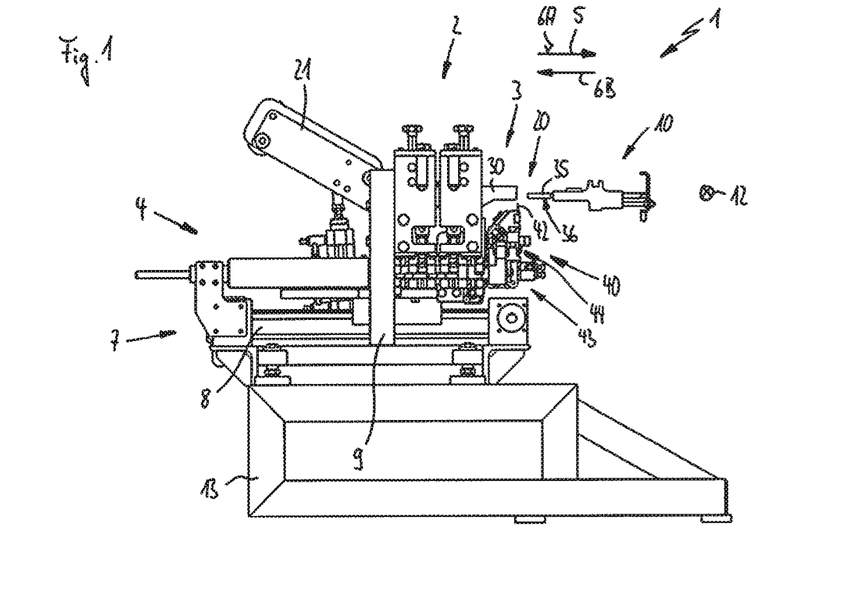
FIG. 1 shows schematically a system for manufacturing a bag for medical purposes in a region in which a tube transfer station is arranged, which has a tube holding means on the holder side and, on the other hand, a tube pulling means in order to be able to introduce tensile forces into an incoming tube in the tube longitudinal direction.

The system 1 for manufacturing a bag (not shown) for medical purposes, which is at least partially shown in FIG. 1, comprises, among other things, a tube transfer station 2, which is shown schematically in a side view according to the illustration according to FIG. 1.

This tube transfer station 2 has a transfer means 3 which can be displaced by means of a traversing mechanism 4 translatively in the introduction direction 5 or tube feed direction 6A or in the direction opposite to the introduction direction 5 in the tube return direction 6B.

This traversing mechanism 4 has at least one linear traversing device 7 with a linear traverse 8 and a sliding carriage 9, on which ultimately the transfer means 3 are suspended.

As seen in the introduction direction 5 or the tube feed direction 6A, a holder 10 is located in front of these transfer means 3, to which an incoming tube 11 (see FIG. 2) is to be transferred.

In this case, the holder 10 runs, as required, in the movement rotation direction 12 in front of the tube transfer station 2 or in front of the transfer means 3 and is stopped in this case in such a way that the incoming tube 11 can be transferred to the holder 10 from the tube transfer station 2 in the sense of the invention.

For this purpose, the holder 10 is guided on a circulating conveyor belt (not shown) of a conveyor device (not shown) of the system 1, wherein the conveyor device is not discussed further since this is sufficiently known from the prior art.

The entire system 1 is fixedly connected to a base (not separately numbered) by a rack 13.

Figure 2:
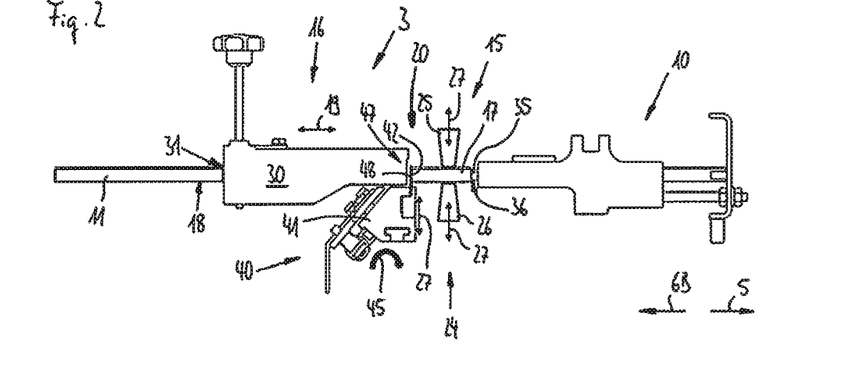
FIG. 2 shows schematically a method step on the tube mounting station shown in FIG. 1, in which a tube, which is mounted on a mandrel, is clamped radially outward and then axially pre-stressed.

As is particularly apparent according to the illustration of FIG. 2, the present tube transfer station 2 is characterized in any case by a tube holding means 15 on the holder side and, on the other side, by a tube pulling means 16, which is arranged for the purpose of introducing tensile forces 19 between a severed tube piece 17 and a remaining tube 18 of the incoming tube 11.

In particular, these tensile forces 19 are introduced in the region of an cutting point and during the severance of the remaining tube 18 from the tube piece 17 to be severed, in order thereby to achieve an improved cut or an improved cutting guide at a severing point or cutting point 20, whereby fewer or significantly fewer tube material residual particles (not shown here) are produced, which can in particular contaminate the later access and thus also the contents of the medical bag.

For applying the tensile forces 19, the tube pulling means 16 has a retraction drive 21, which is assigned to the transfer means 3, so that this retraction drive 21 can be moved together with the transfer means 3 by means of the linear traversing device 7.

In particular, by means of the tube pulling means 16 in cooperation with the tube holding means 15, an elongation of the incoming tube 11 of 1% to 10% can be achieved, particularly in the region of the cutting point 20.

Particularly advantageous is an elongation of about 4%, since it has been found that the cut can in this case take place in such a way that hardly any more tube material residual particles are produced during cutting.

The tube holding means 15 assigned to the holder, 10 at least in this exemplary embodiment, comprises a clamping device (not separately numbered) in the form of a tube clamp 24 which engages radially outwards and which in particular has two clamping elements 25 and 26 which can be fed to the tube piece 17 to be severed, wherein the two clamping elements 25 and 26 are movably mounted transversely, i.e., in the radial direction 27, relative to the introduction direction 5.

The tube pulling means 16, on the other hand, is at least supplemented in this exemplary embodiment by fixing elements, not shown further here, and/or by the retraction drive 21, which are assigned to the transfer means 3.

In this respect, on the one hand, the tube piece 17 to be severed held on the holder 10 can be fixed or held on the holder 10 and, on the other hand, the remaining tube of the incoming tube 11 can be fixed or held on the transfer means 3, wherein the present tube pulling means 16 is realized in a particularly simple manner by the transfer means 3 configured in this way.

The incoming tube 11 is guided in the present case laterally particularly precisely at the transfer means 3 since the transfer means 3 has a basic body 30 which at least has a feed through channel 31 for the incoming tube 11 through which the incoming tube 11 is guided in the feed direction 5 and thus can be moved with respect to the basic body 30.

In order that the incoming tube 11 or the tube piece 17 to be severed can then be fixed in a secure manner on the holder side, the holder 10 has, especially in this exemplary embodiment, a mandrel 35 which is configured here as a dome-shaped central electrode 36.

Advantageously, the dome 35 or the dome-shaped central electrode 36 has an outer diameter (not separately numbered) which is complementary to the inner diameter (also not explicitly numbered) of the incoming tube 11 such that the incoming tube 11 conveyed in the tube feed direction 6A is reliably mounted on the dome 35 or the dome-shaped central electrode 36.

In particular, on account of this special embodiment, a tube mounting station (not additionally numbered) can also be referred to in the present case with regard to the tube transfer station 2.

This is the same with respect to the transfer means 3, wherein in the present case a mounting means (not additionally numbered) is used for mounting the incoming tube 11 onto the holder 10.

A severing or cutting device 40, which is arranged together with the transfer means 3 on the linear traversing device 7, is further assigned to the tube transfer station 2.

In this exemplary embodiment, the severing or cutting device 40 has a cutting head 41 which carries a blade 42 for cutting the incoming tube 11.

The severing or cutting device 40 is also characterized in that it has on the one hand a lifting-lowering drive 43 and, on the other hand, additionally a tilting drive 44.

Thus, the blade 42 can be moved translatively not only in the radial direction 27 with respect to the introduction direction 5 of the incoming tube 11, but in the direction of the arrow 45, the blade can be guided along a circular path 46 (see in particular FIG. 5) by means of the tilting drive 44, in order to be removed downward from the cutting point 20.

In this exemplary embodiment, the blade 42 has, by way of example, a thickness of only 0.2 mm, which in turn has a very favorable effect on the prevention of tube material residual particles during the severance of the incoming tube 11.

According to the representation of FIG. 2, the tube transfer station 2 is shown in a method state in which the incoming tube 11 has already been fed to the holder 10, wherein the tube piece 17 or the already severed tube piece 17 is mounted onto the mandrel 35 of the holder 10.

The incoming tube 11 or the already severed tube piece 17 is also held by the tube holding means 15 in the form of the tube clamp 24 engaging radially outwards, wherein the incoming tube 11 is drawn longitudinally by means of the tube pulling means 16 and the tube piece 17 to be severed from the remaining tube 18 of the incoming tube 11 is already severed.

The blade 42, while the tensile forces 19 are already acting on the designated cutting point 20, has been guided through the tube 11, so that the incoming tube 11 follows the tensile forces 19 at least on the one side, but preferably on both sides, at the severed point 20, and a cleft 48 arises after the severance, which in any case is wider than the thickness of the blade 42.

Figure 3:
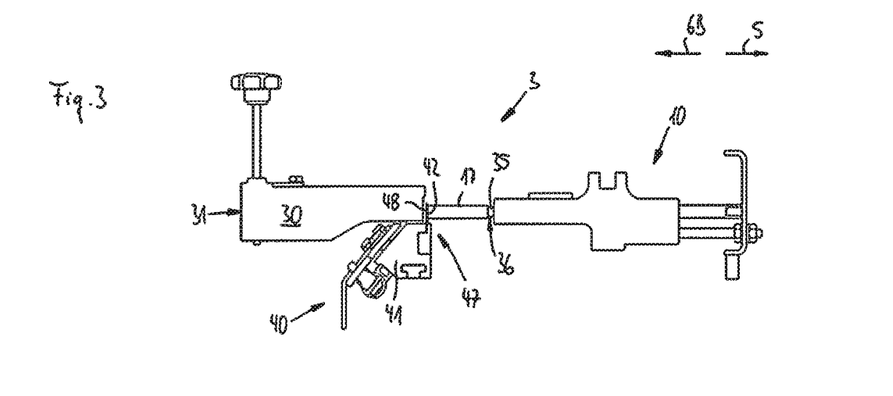
FIG. 3 shows schematically a further method step on the tube mounting station shown in FIG. 1, in which the tube clamped radially outward and axially pre-stressed is cut.

While according to the representation of FIG. 2, the tube transfer station 2 is still shown with activated tube clamp 24 and a straight-cut incoming tube 11, a next method step of the tube transfer station 2 is already shown according to the representation of FIG. 3, in which the clamping elements 25 and 26 of the tube clamp 24 engaging radially outward are displaced radially outward and back again. However, the blade 42 is still located in the cutting position 47.

Figure 4:
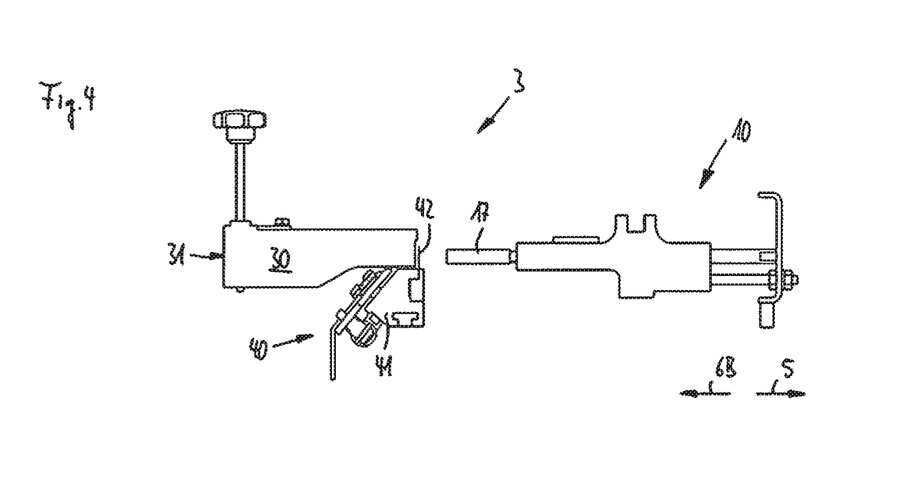
FIG. 4 shows schematically a next method step on the tube transfer station shown in FIG. 1, in which the tube pulling means and the blade are axially retracted.
Figure 5:
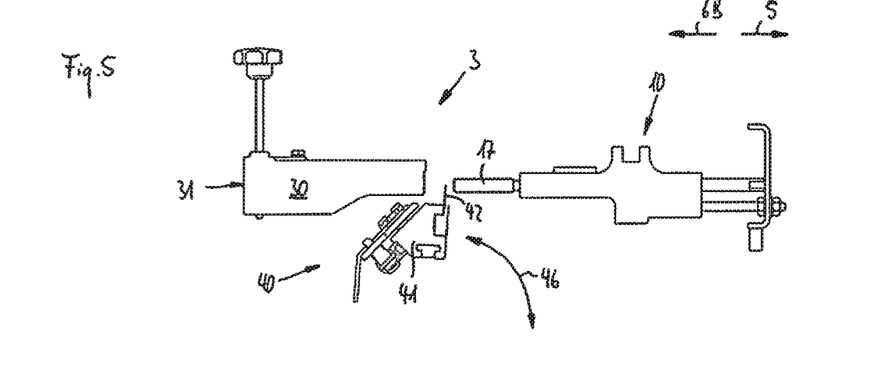
FIG. 5 shows schematically a subsequent method step on the tube transfer station shown in FIG. 1, in which the blade is folded away radially downwards.

According to the representation of FIG. 4, the blade 42, after the severing of the incoming tube 11, is released both from the severed tube piece 17 and from the remaining tube 18, both on the one side by means of a translational movement in the tube return direction 6B of the transfer means 3, and on the other side by means of a tilting movement of the blade along the circular path 46 according to the representation of FIG. 5.

Figure 6:
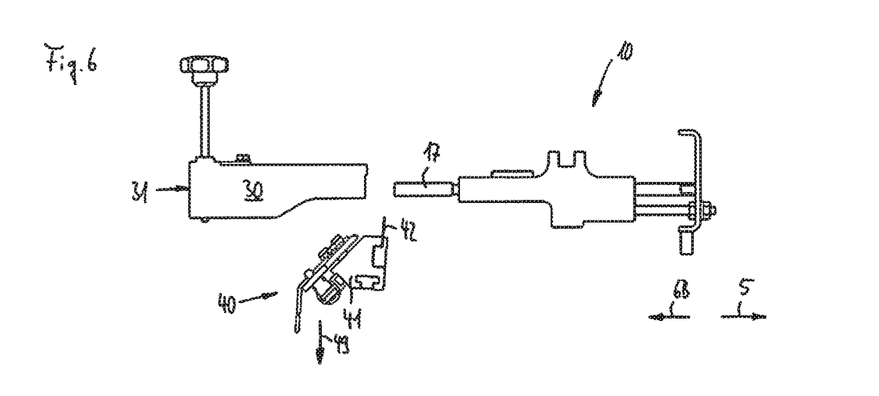
FIG. 6 shows schematically a subsequent method step on the tube transfer station shown in FIG. 1, in which the blade is displaced translatively radially downwards.

According to the representation of FIG. 6, the tube transfer station 2 is shown in a next method step in which the blade 42 or the entire cutting head 41 is additionally lowered downwards in the downward direction 49 by means of the lifting-lowering drive 43 so that the blade 42 is fully moved out of the region of the cutting point 20.

Finally, according to the representation of FIG. 7, the blade 42 is again tilted back into a standby position 50 so that the incoming tube 11 can be fed to a further holder 10 according to the tube feed direction 6A.

Figure 7:
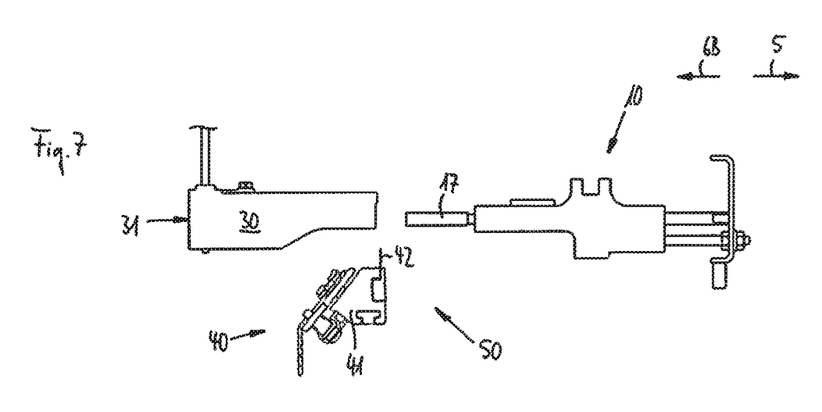
FIG. 7 shows schematically a further method step on the tube transfer station shown in FIG. 1, in which the blade, in preparation for a next cut, is folded again upward in a standby position along the circular path.

It is understood that, after the blade 42 has been released from the severed tube piece 17, the holder 10 can be fed to a further processing station (not shown here) of the system 1, and that the severed tube piece 17 still held on the holder 10 is provided for further processing at this further processing station.

At this point, it should be explicitly pointed out that the features of the solutions described above or in the claims and/or figures can also be combined if necessary in order to be able to implement and achieve the described features, effects and advantages cumulatively.

It should be understood that the above-described embodiment is merely a first embodiment of the system according to the invention or of the tube transfer station and of the method according to the invention, in this respect the embodiment of the invention is not limited to this exemplary embodiment.

All the features disclosed in the application documents are claimed as essential to the invention insofar as they are novel, individually or in combination, as compared with the prior art.

LIST OF REFERENCE NUMBERS

1 System
2 Tube transfer station
3 Transfer means
4 Traversing mechanism
5 Introduction direction
6A Tube feeding direction
6B Tube return direction
7 Linear traversing device
8 Linear traverse
9 Sliding carriage
10 Holder
11 Incoming tube
12 Movement rotation direction
13 Frame
15 Tube holding means
16 Tube pulling means
17 Transferred, severed or severing tube piece
18 Remaining tube
19 Tensile forces
20 Cutting point or designated point
21 Retraction drive
24 Tube clamp engaging radially outwards
25 First clamping element
26 Second clamping element
27 Radial direction
30 Basic body
31 Feed through channel
35 Mandrel
36 Mandrel-shaped central electrode
40 Separating or cutting device
41 Cutting head
42 Blade
43 Lifting-lowering drive
44 Tilting drive
45 Arrow
46 Circular path
47 Cutting position
48 Cleft
49 Downward direction
50 Standby position

The invention claimed is:

1. A system for the manufacture of a bag for medical purposes, the system comprising: a tube transfer station having a transfer means for transferring a tube coming into the tube transfer station to a holder and for the local severance of a transferred tube piece from a remaining tube of the incoming tube to the holder in order to subsequently connect the severed tube piece to two film layers for forming an access to the bag, wherein the tube transfer station has a tube holding means on the holder side and, on the other side, a tube pulling means, which are arranged to introduce tensile forces between the severed tube piece and the remaining tube of the incoming tube, while the severance is performed, the system further comprising a linear traversing device with a linear traverse and a sliding carriage supporting the tube pulling means and the tube holding means, wherein the tube holding means is arranged to be stationary relative to the sliding carriage and the tube pulling means is arranged to move linearly relative to the sliding carriage, away from the tube holding means to provide the tensile forces between the severed tube piece and the remaining tube of the incoming tube, while the severance is performed.

2. The system according to claim 1, wherein the holder has a mandrel arranged to extend into a lumen of the transferred tube piece.

3. The system according to claim 2, wherein the mandrel comprises a mandrel-shaped central electrode.

4. The system according to claim 2, wherein the tube holding means has an externally engaging tube clamp aligned with the mandrel and arranged to move toward the mandrel to clamp the transferred tube piece.

5. The system according to claim 1, wherein the holder has an externally engaging tube clamp.

6. The system according to claim 1, wherein the holder is fixed in an introduction direction of the incoming tube.

7. The system according to claim 1, wherein the transfer means has a feed through channel for the incoming tube.

8. The system according to claim 1, wherein the transfer means is configured to transfer the incoming tube in an introduction direction toward the holder, and the transfer means can be moved back and forth in the introduction direction.

9. The system according to claim 8, wherein the transfer means is arranged to move the feed through channel close to the holder, then to transfer the incoming tube at least with the tube piece to be severed, and after the severance of the tube piece to remove the remaining tube of the incoming tube again from the holder through the feed through channel.

10. The system according to claim 1, wherein the tube pulling means has a retraction drive arranged to move the tube pulling means to provide tensile forces between the severed tube piece and the remaining tube of the incoming tube, while the severance is performed.

11. The system according to claim 10, wherein the tube pulling means has a clamp arranged to clamp the incoming tube.

12. The system according to claim 11, wherein the clamp is arranged to be driven opposite the tube holding means via a coupling with the transfer means.

13. The system according to claim 11, wherein the clamp is arranged to move relative to the tube holding means to provide tensile forces between the severed tube piece and the remaining tube of the incoming tube, while the severance is performed.

14. The system according to claim 13, wherein the clamp is arranged to move away from the tube holding means to provide tensile forces between the severed tube piece and the remaining tube of the incoming tube, while the severance is performed.

15. The system according to claim 13, wherein the retraction drive is arranged to move the clamp relative to the tube holding means to provide the tensile forces between the severed tube piece and the remaining tube of the incoming tube, while the severance is performed.

16. The system according to claim 1, wherein the tube pulling means, in cooperation with the tube holding means, is arranged to exert an elongation of 1% to 10% on the transition from the tube piece to be severed to the remaining tube between the tube pulling means and the tube holding means, in particular of 2% to 6%, especially of about 4%.

17. The system according to claim 1, wherein the tube transfer station has a blade which is driven from a standby position through the incoming tube.

18. The system according to claim 17, wherein the blade has a tilting drive.

19. The system according to claim 18, wherein the tilting drive is arranged to tilt the blade away from the transfer means.

20. The system according claim 17, wherein the blade is driven moving in an oblique manner through the tube.

21. The system according to claim 17, wherein the blade has a thickness of at most 1 mm, in particular of at most 0.8 mm, preferably of at most 0.5 mm, particularly preferably below 0.2 mm.

22. The system according to claim 17, wherein the tube pulling means and the blade are arranged on the transfer means side, whereas the tube holding means is arranged on the holder side.

23. The system according to claim 1, wherein the tube transfer station has a blade which is driven from a standby position through the incoming tube, wherein the blade, after severance, is driven released from the remaining tube, and longitudinally in the tube direction or with a movement component longitudinally in the tube direction.

24. The system according to claim 23, wherein the blade has a tilting drive.

25. The system according to claim 1, wherein the transfer means is configured to transfer the incoming tube in an introduction direction toward the holder, and wherein the tube pulling means is arranged to move in a tube return direction, which is generally opposite the introduction direction, to provide the tensile forces between the severed tube piece and the remaining tube of the incoming tube.

* * * * *